US007117174B2

(12) United States Patent
Corvin

(10) Patent No.: US 7,117,174 B2
(45) Date of Patent: Oct. 3, 2006

(54) CAPITAL ANALYSIS TOOL FOR MEDICAL DIAGNOSTIC SYSTEMS AND INSTITUTIONS

(75) Inventor: Christoph T. Corvin, Milwaukee, WI (US)

(73) Assignee: General Electric Company, Schenectady, NY (US)

(*) Notice: Subject to any disclaimer, the term of this patent is extended or adjusted under 35 U.S.C. 154(b) by 983 days.

(21) Appl. No.: 09/748,585

(22) Filed: Dec. 22, 2000

(65) Prior Publication Data

US 2002/0082963 A1   Jun. 27, 2002

(51) Int. Cl.
*G06F 17/60* (2006.01)
(52) U.S. Cl. .......................................... 705/36; 705/35
(58) Field of Classification Search ............. 705/35–40
See application file for complete search history.

(56) References Cited

U.S. PATENT DOCUMENTS 5,812,988 A * 9/1998 Sandretto .................... 705/36
6,321,205 B1 * 11/2001 Eder ............................ 705/7
6,581,045 B1 * 6/2003 Watson ....................... 705/400
2002/0032585 A1 * 3/2002 Keyes ............................ 705/4
2002/0049653 A1 * 4/2002 Johnson et al. ............. 705/35

FOREIGN PATENT DOCUMENTS

JP          08335235 A   * 12/1996
JP          11328252 A   * 10/1999

OTHER PUBLICATIONS

Hosios et al "A Model to support Radiographic Equipment Allocation Decisions" The Journal of Operational Research, vol. 29, No. 3 (Mar. 1978) pp. 205-214.*

* cited by examiner

*Primary Examiner*—Hani M. Kazimi
*Assistant Examiner*—Narayanswamy Subramanian
(74) *Attorney, Agent, or Firm*—Fletcher Yoder

(57) ABSTRACT

The present technique is associated with financial analysis of a capital investment in medical resources. The technique allows a client to interact with a remote financial analysis system via a network interface, and to enter and transmit client data associated with a desired capital investment to the financial analysis system for an investment analysis. The financial analysis system then provides a customized investment report for the desired capital investment to assist the client in evaluating the feasibility of the investment.

65 Claims, 6 Drawing Sheets

| HOME | PAGE 1 | PAGE 2 | PAGE 3 | PAGE 4 | PAGE 5 | PAGE 6 | PAGE 7 | HELP |

(TM) COMPANY NAME — 122     SERVICE

NEW HEALTHCARE PROCEDURES: [DESCRIPTION 1]

PROJ. VOLUME

|  | YR.1 | YR.2 | YR.3 | YR.4 | YR.5 |
|---|---|---|---|---|---|
| INPATIENT | VOL1A | VOL2A | VOL3A | VOL4A | VOL5A |
| OUTPATIENT | VOL1B | VOL2B | VOL3B | VOL4B | VOL5B |

CHARGE ($) PER PROCEDURE:
- INPATIENT [I-CHG]
- OUTPATIENT [O-CHG]

[ADD ANOTHER NEW HEALTHCARE PROCEDURE]

LOST HEALTHCARE PROCEDURES: [DESCRIPTION 2]

PROJ. VOLUME

|  | YR.1 | YR.2 | YR.3 | YR.4 | YR.5 |
|---|---|---|---|---|---|
| INPATIENT | LV1A | LV2A | LV3A | LV4A | LV5A |
| OUTPATIENT | LV1B | LV2B | LV3B | LV4B | LV5B |

CHARGE ($) PER PROCEDURE:
- INPATIENT [LOST-IC]
- OUTPATIENT [LOST-OC]

[ADD ANOTHER LOST HEALTHCARE PROCEDURE]

PAYOR MIX:

INPATIENT:

|  | YR.1 | YR.2 | YR.3 | YR.4 | YR.5 |
|---|---|---|---|---|---|
| PAYOR #1 | V1-1 | V1-2 | V1-3 | V1-4 | V1-5 |
| PAYOR #N | VN-1 | VN-2 | VN-3 | VN-4 | VN-5 |
| TOTAL | TOT1 | TOT2 | TOT-3 | TOT4 | TOT5 |

OUTPATIENT:

|  | YR.1 | YR.2 | YR.3 | YR.4 | YR.5 |
|---|---|---|---|---|---|
| PAYOR #1 | V1-1 | V1-2 | V1-3 | V1-4 | V1-5 |
| PAYOR #N | VN-1 | VN-2 | VN-3 | VN-4 | VN-5 |
| TOTAL | TOT1 | TOT2 | TOT-3 | TOT4 | TOT5 |

HEALTHCARE INFLATION:

|  | YR.1 | YR.2 | YR.3 | YR.4 | YR.5 |
|---|---|---|---|---|---|
| INPATIENT | I1-1 | I1-2 | I1-3 | I1-4 | I1-5 |
| OUTPATIENT | I2-1 | I2-2 | I2-3 | I2-4 | I2-5 |

[CONTINUE]     [BACK]

FIG. 6

CAPITAL ANALYSIS TOOL FOR MEDICAL DIAGNOSTIC SYSTEMS AND INSTITUTIONS

FIELD OF THE INVENTION

The present invention relates generally to financial analysis systems and, more particularly, to a financial analysis technique for evaluating capital investments in medical resources for a medical facility. The present technique permits data exchange between a financial analysis system and a remote interface via a network, allowing a client to interact with the financial analysis system and to receive a capital investment analysis report for a desired capital investment based on client data associated with the desired capital investment.

BACKGROUND OF THE INVENTION

Medical institutions require various medical resources, such as real estate, human resources, medical systems, equipment and instruments, to provide healthcare services to patients. The medical resources employed at a particular medical institution greatly impact the efficiency, cost and revenue associated with a desired medical procedure. For example, a current system may allow a procedure to be completed in 20 minutes with 10 minutes of setup time, while another system may complete the procedure in 10 minutes with only 2 minutes of setup time. Less time means more procedures, and thus more revenue and lower patient waiting time for the procedures. As medical technology advances, particularly in the area of electronics and computer aided instruments, medical institutions must evaluate the feasibility of investing in new, additional or upgraded medical resources to better serve patients and become more efficient and profitable.

For example, medical diagnostic and imaging systems are ubiquitous in modem health care facilities. Such systems provide invaluable tools for identifying, diagnosing and treating physical conditions and greatly reduce the need for surgical diagnostic intervention. In many instances, final diagnosis and treatment proceed only after an attending physician or radiologist has complemented conventional examinations with detailed images of relevant areas and tissues via one or more imaging modalities.

Currently, a number of modalities exist for medical diagnostic and imaging systems. These include computed tomography (CT) systems, x-ray systems (including both conventional and digital or digitized imaging systems), magnetic resonance (MR) systems, positron emission tomography (PET) systems, ultrasound systems, nuclear medicine systems, and so forth. In many instances, these modalities complement one another and offer the physician a range of techniques for imaging particular types of tissue, organs, physiological systems, and so forth. Health care institutions often dispose of several such imaging systems at a single or multiple facilities, permitting its physicians to draw upon such resources as required by particular patient needs.

Modem medical diagnostic systems typically include circuitry for acquiring image data and for transforming the data into a useable form which is then processed to create a reconstructed image of features of interest within the patient. The image data acquisition and processing circuitry is often referred to as a "scanner" regardless of the modality, because some sort of physical or electronic scanning often occurs in the imaging process. The particular components of the system and related circuitry, of course, differ greatly between modalities due to their different physics and data processing requirements.

Medical diagnostic systems of the type described above are often called upon to produce reliable and understandable images within demanding schedules and over a considerable useful life. To ensure proper operation, the systems are serviced regularly by highly trained personnel who address imaging problems, configure and calibrate the systems, and perform periodic system checks and software updates. However, medical resources such as the above systems may become outdated, or relatively inefficient and costly compared to current medical systems. Accordingly, a medical institution may desire an investment analysis of various capital investments, such as medical products, systems and services offered by a medical resource supplier.

Unfortunately, the medical institution may not have access to a financial analysis system, or operating statistics for a particular medical resource (e.g., medical diagnostic and imaging systems). Furthermore, the financial systems currently available may not be suitable for analyzing financial data associated with medical institutions, and more particularly to capital investments in medical resources. For example, medical institutions may have specific financial data (e.g., variable and fixed costs, revenues, deductions, etc.), which is significantly different from financial data associated with other fields and industries. Even within the medical field, the specific financial data may vary greatly from institution to institution.

Accordingly, there is a need for a technique for analyzing an investment in medical resources for a medical institution based on operating data from the medical institution. More particularly, there is a need for a financial analysis system allowing interactive exchange of information, such as client data and investment analysis reports, between a remote client interface and the financial analysis system via a network.

SUMMARY OF THE INVENTION

The present technique is associated with financial analysis of an investment in medical resources for a medical facility. The technique allows a client to interact with a remote financial analysis system via a network interface, and to enter and transmit client data associated with a desired capital investment to the financial analysis system for an investment analysis. The client data is utilized by the financial analysis system to tailor the investment analysis for the particular client, or medical facility. Accordingly, the client receives a customized investment report for the desired capital investment to better assist the client in evaluating the feasibility of the investment.

According to one aspect of the present technique, a method may be provided for analyzing an investment in medical resources for a medical facility. The method comprises providing access to a financial analysis system via a network, and providing a network interface having a form for communication and data exchange with the financial analysis system. The method also comprises analyzing client data with the financial analysis system, and providing an investment analysis report to a client via the network. The data exchanged with the financial analysis system may include financial data for a desired investment in medical resources for the medical facility.

According to another aspect of the present technique, a system may be provided for analyzing an investment in medical resources for a medical facility. The system comprises a financial analysis system remote from a client computer system, and a network for coupling the client computer system to the financial analysis system. The system also has an investment analysis module operative on the financial analysis system for analyzing a capital investment in a desired medical resource. The client computer system is configured to transmit client data to the investment analysis module. The investment analysis module is configured to evaluate the client data, which includes financial data relating to the capital investment, and to generate an investment analysis report of the capital investment tailored to the client data.

BRIEF DESCRIPTION OF THE DRAWINGS

The foregoing and other advantages of the invention will become apparent upon reading the following detailed description with reference to the drawings in which:

FIGS. 4, 5 and 6 are exemplary query forms for entering client data associated with a capital investment desired by the client, and for transmitting the client data from the client to the data processing center.

DETAILED DESCRIPTION OF THE INVENTION

Figure 1:
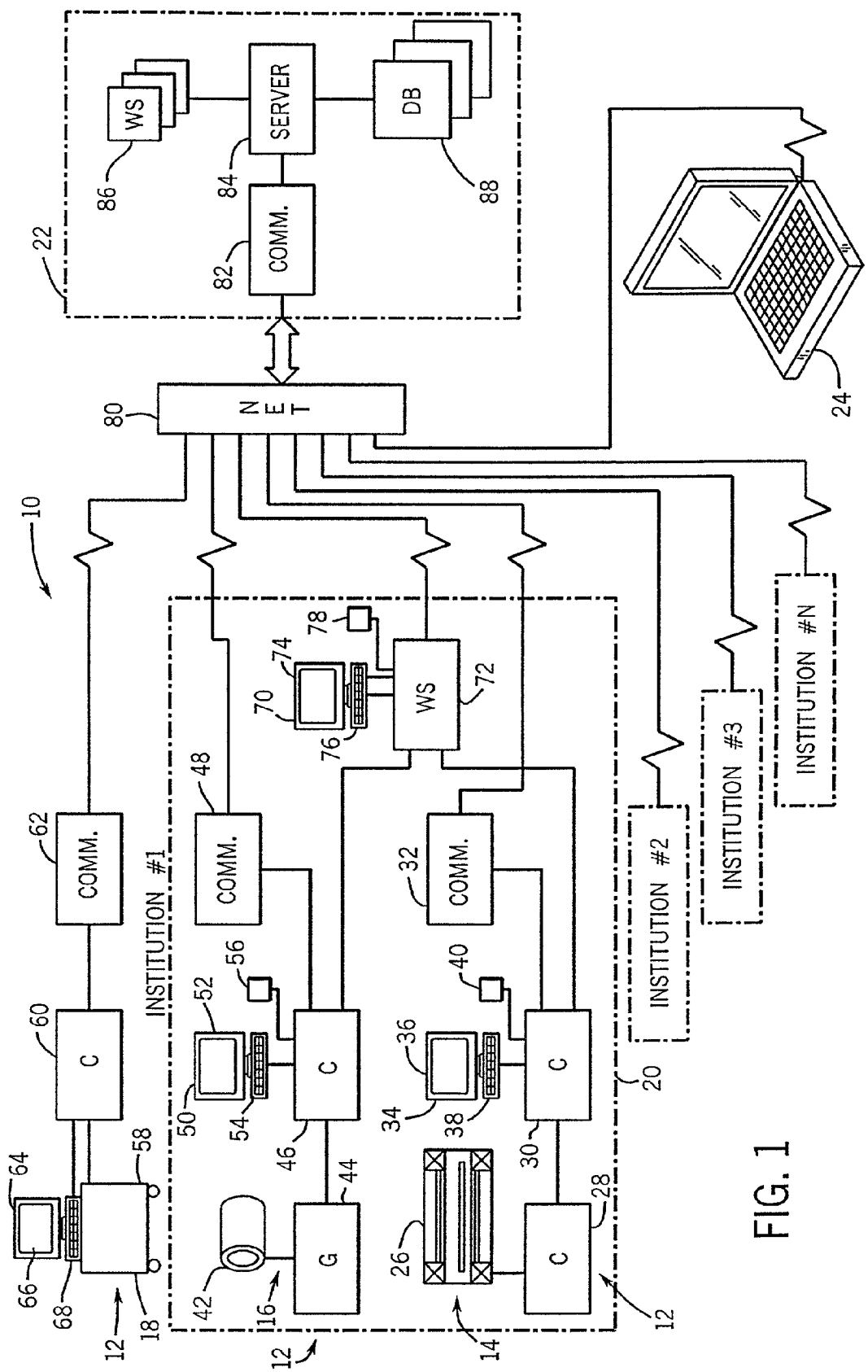
FIG. 1 is a diagram of the present technique, illustrating an exemplary system for communication and data exchange between a plurality of medical clients and a data processing center remote from the medical clients.

Turning now to the drawings, and referring first to FIG. 1, a communication system 10 is illustrated for providing remote data processing for a plurality of healthcare providers having a plurality of medical resources, such as medical diagnostic systems 12. In the embodiment illustrated in FIG. 1, the medical diagnostic systems 12 include a magnetic resonance imaging (MRI) system 14, a computed tomography (CT) system 16, and an ultrasound imaging system 18. The diagnostic systems 12 may be positioned in a single location or facility, such as institutions #1, #2, #3 and #N (e.g., medical facility 20), or may be remote from one another as illustrated for ultrasound imaging system 18. Each medical facility also may gain remote access to a data processing center 22 via the communication system 10. The data processing center 22 is also accessible via a remote client unit 24. Accordingly, multiple client workstations and medical institutions with various modalities have access to the data processing center 22.

In the exemplary embodiment of FIG. 1, several different medical clients (e.g., institutions #1, #2, #3 and #N) are provided with remote access to the data processing center 22. These and other medical clients may be provided access to, and benefit from, the data processing center 22, depending upon the capabilities of the data processing center 22, and other factors. However, the present technique is particularly well suited for remotely processing client data associated with a wide variety of medical diagnostic system modalities, including MRI systems, CT systems, ultrasound systems, positron emission tomography (PET) systems, nuclear medicine systems, and so forth. Moreover, the medical clients utilizing the data processing center 22 in accordance with the present techniques may be in different medical fields, may have different medical resources, and may have different types of patients. For example, medical resources may include a variety of medical equipment, systems, instruments and human resources for a particular medical procedure or medical practice. Furthermore, medical resources may include real estate, office space, healthcare service capacity, and financial resources of a particular institution. A variety of client data may be transmitted to the data processing center 22 via the communication system 10. For example, the client may transmit data from the medical diagnostic systems, data files from a computer, or data may be entered from a client computer coupled to the communication system 10 (e.g., remote client unit 24). The client data may comprise a variety of information associated with the client, the particular medical institution, and with the medical resources available to the particular medical institution. For example, the client data may comprise past and projected financial data/statistics, operational data/statistics, medical resources used or desired by the client, patient information, and other relevant client data from past operations or future projections.

The medical resources, as noted above, may comprise a variety of medical systems. Depending upon the modality of the systems, various subcomponents or subsystems will be included. In the case of MRI system 14, such systems will generally include a scanner 26 for generating pulsed magnetic fields and for collecting signals from emissions by gyromagnetic material within a subject of interest. The scanner is coupled to a control and signal detection circuit 28 which, in turn, is coupled to a system controller 30. The system controller 30 includes a uniform platform for interactively exchanging client data and processing requests with data processing center 22, as described more fully below. The system controller 30 is linked to a communications module 32, which may be included in a single or separate physical package from system controller 30. System controller 30 is also linked to an operator station 34, which will typically include a computer monitor 36, a keyboard 38, as well as other input devices 40, such as a mouse. In a typical system, additional components may be included in system 14, such as a printer or photographic system for producing reconstructed images based upon data collected from scanner 14. Although reference is made herein generally to "scanners" in diagnostic systems, that term should be understood to include medical diagnostic data acquisition equipment generally. Accordingly, it should not be limited to image data acquisition, to picture archiving communications and retrieval systems, nor to image management systems, facility or institution management systems, viewing systems and the like, in the field of medical diagnostics. More particularly, the medical resources may include imaging systems, clinical diagnostic systems, physiological monitoring systems, and so forth.

Similarly, CT system 16 will typically include a scanner 42, which detects portions of x-ray radiation directed through a subject of interest. Scanner 42 is coupled to a generator and controller, as well as to a signal acquisition unit, represented collectively at reference numeral 44, for controlling operation of an x-ray source and gantry within scanner 42, and for receiving signals produced by a detector array moveable within the scanner. The circuitry within the controller and signal acquisition components is coupled to a system controller 46 which, like controller 30 mentioned above, includes circuitry for commanding operation of the scanner and for processing and reconstructing image data based upon the acquired signals. System controller 46 is linked to a communications module 48, generally similar to communications module 32 of MRI system 14, for transmitting and receiving data for processing at the data processing center 22. Also, the system controller 46 is coupled to an operator station 50, which includes a computer monitor 52, a keyboard 54, as well as other input devices 56, such as a mouse. Moreover, like MRI system 14, CT system 16 will generally include a printer or similar device for outputting reconstructed images based upon data collected by scanner 42.

Other modality devices will include circuitry and hardware particularly configured for acquiring or producing signals in accordance with their particular design. In particular, in the case of ultrasound system 18, such systems will generally include a scanner and data processing unit 58 for transmitting ultrasound signals into a subject of interest, and for acquiring resultant signals which are processed for reconstructing a useful image. The system includes a system controller 60 which regulates operation of scanner 58 and which processes acquired signals to reconstruct the image. Moreover, system 18 includes a communications module 62 for transmitting client data and processing requests between system controller 60 and the data processing center 22. System 18 also includes an operators station 64, including a monitor 66, as well as input devices such as a keyboard 68.

Where more than one medical diagnostic system is provided in a single facility or location, as indicated in the case of MRI and CT systems 14 and 16 in FIG. 1, these may be coupled to a management station 70, such as in a radiology department of a hospital or clinic. The management station may be linked directly to controllers for the various diagnostic systems, such as controllers 30 and 46 in the illustrated embodiment. The management system may include a computer workstation or personal computer 72 coupled to the system controllers in an Intranet configuration, in a file sharing configuration, a client/server arrangement, or in any other suitable manner. Moreover, management station 70 will typically include a monitor 74 for viewing system operational parameters, analyzing system utilization, and exchanging client data and processing information between the facility 20 and the data processing center 22. Input devices, such as a standard computer keyboard 76 and mouse 78, may also be provided to facilitate the user interface. It should be noted that, alternatively, the management system, or other diagnostic system components, may be "stand-alone" or not coupled directly to a diagnostic system. Although the data processing center 22 may require a variety of client data to fully process a client request, the client data may not include medical system data derived directly from the medical system (e.g., CT and MRI systems). The client data may simply be transmitted from a client computer (e.g., remote client unit 24) after having been entered by the medical client. For example, the client data may be entered via an electronic form, or web interface.

The communication modules mentioned above, as well as workstation 72 and remote client unit 24, may be linked to data processing center 22 via a remote access network 80. For this purpose, any suitable network connection may be employed. Presently preferred network configurations include both proprietary or dedicated networks, as well as open networks, such as the Internet. Data may be exchanged between the institutions, medical resources, client computers and the remote data processing center 22 in any suitable format, such as in accordance with the Internet Protocol (IP), the Transmission Control Protocol (TCP), or other known protocols. Moreover, certain portions of the data may be transmitted or formatted via markup languages such as the HyperText Markup Language (HTML), Extensible Markup Language (XML), or other Internet and communication languages. Exemplary interface structures and communications components are described in detail below.

Within the data processing center 22, messages, client requests and client data are received by communication components as indicated generally at reference numeral 82. The communication components 82 direct the client data to a server, or a processing system 84, for the receipt, handling and processing of client data. In general, processing system 84 may include one or a plurality of computers, as well as dedicated hardware or software servers for processing the various requests and for receiving and transmitting the information as described more fully below. The data processing center 22 also may include a bank of workstations 86, which may be staffed by operators who address the processing requests and provide off and on-line assistance in response to the processing requests. Also, the processing system 84 may be linked to a set of databases or other processing systems 88 at or remote from the data processing center 22. Such databases and processing systems may include extensive database information on medical resources (e.g., medical systems), a particular medical facility, and so forth. As described below, such databases may be employed both for analyzing the client data and for processing the request transmitted by the client.

Figure 2:
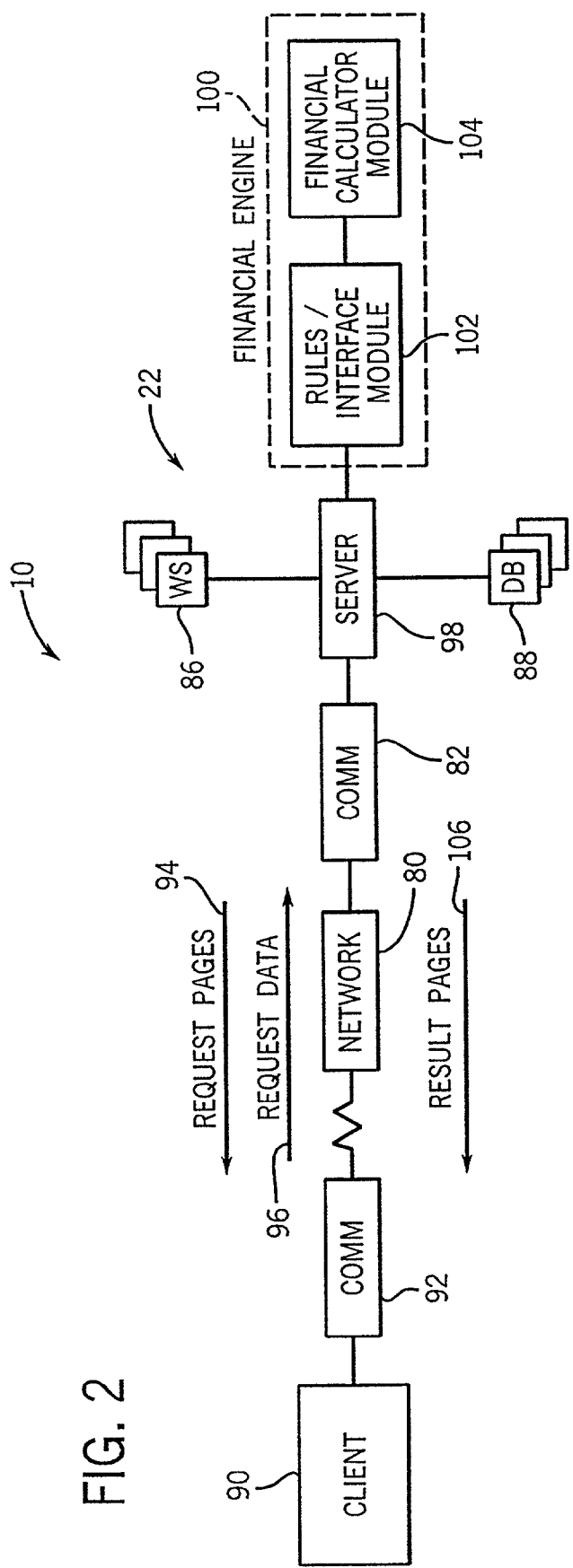
FIG. 2 is a diagram of the present technique, illustrating an exemplary embodiment of the data processing center and data exchange between the data processing center and a client.

FIG. 2 is a diagram of the communication system 10, illustrating an exemplary embodiment of the data processing center 22 accessible by a client 90. The client 90 may be a medical facility, institution or individual interested in medical resources. The data processing center 22 may be associated with a medical supplier, a medical institution, or some other entity located remote from the client 90. For example, the data processing center 22 may be associated with a financial consulting firm, or some other financial analysis entity. The client 90 can communicate with the data processing center 22 via a communication device 92, which connects to the network 80 and the communication components 82 for the data processing center 22. The communication device 92 may be a modem or some other network device, allowing the client 90 to connect to the network 80 with a client computer system (e.g., remote client unit 24). The client 90 may access the network 80 via the Internet or other suitable network connections, thus the network 80 can be broadly interpreted to comprise all necessary networking between the client 90 and the data processing system 22.

In this exemplary embodiment, the client 90 electronically receives request pages 94 (e.g., data entry forms) from the data processing center 22, or an applications server for the network (e.g., Internet). For example, the client 90 may go to a web site having the request pages. The client 90 enters data, makes appropriate selections, and transmits a processing request to the data processing center 22. Accordingly, request data 96 is routed through the network 80 and to the data processing center 22. The request data 96 may comprise a variety of client data, as discussed above. The request data 96 is received by a server, or processing system 98, which handles the request, interprets and evaluates the request data, and provides a data analysis based on the request data. The processing system 98 may include a plurality of computer systems, servers, workstations 86, databases 88, and other hardware and software applications necessary for processing the request data.

In this exemplary embodiment, the processing system 98 has a financial engine 100 for financially analyzing the request data, and for generating a financial analysis tailored to the request data from the client. The financial engine 100 may be a remote analysis system, accessible by the processing system 98, or it may be an integral part of the processing system 98. The financial engine 100 has a rules and interface module 102 and a financial calculator module 104, which jointly work to provide a customized financial analysis for the client 90 based on the request data 96.

The rules and interface module 102 comprises rules for financially analyzing the request data, including tax rules and other considerations for the medical field. Accordingly, the rules and interface module 102 adapts the financial calculator module 104 to the desired industry or field, such as medical resources. For example, the medical field may be subject to specific taxes, laws, regulations, and various accounting and/or financial practices unlike other fields. By providing such rules, the financial calculations are customized for the medical field, enabling the financial engine 100 to more accurately analyze the client request data. Alternatively, the rules and interface module 102 may simply comprise an interface for procuring communication between the processing system 98 and the financial engine 100, particularly where the two systems are remote from one another or require translation from one system to the other (e.g., different software or communication protocols).

After analyzing the request data, the financial engine 100 provides a financial analysis tailored to the request data. Result pages 106 are then transmitted to the client 90 via the communication system 10, either directly from the financial engine 100 or after further processing by the processing system 98. For example, the processing system 98 may generate user viewable pages based on the financial analysis. The client may then view the result pages via a network interface, which may be a client computer system having an Internet browser or other appropriate software.

Figure 3:
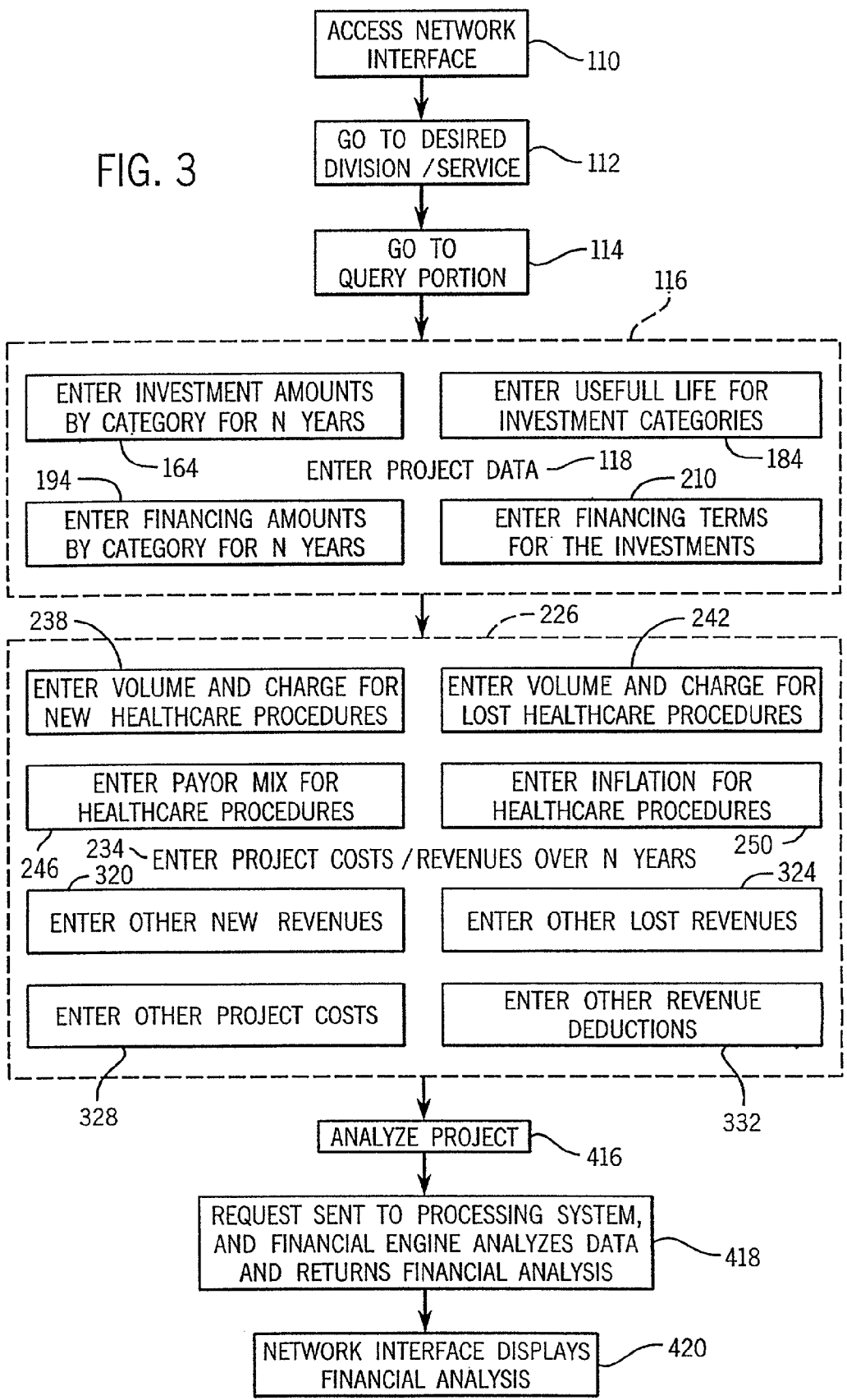
FIG. 3 is an exemplary flow chart of the present technique, with reference to the network interface pages of FIGS. 4, 5 and 6.

FIG. 3 is a diagram of the present technique, illustrating communication and data exchange between the client 90 and the data processing center 22. In this exemplary embodiment, the client 90 accesses a network interface 110, which may include a plurality of hardware and software applications for communicating with the data processing center 22. For example, the network interface may comprise a client computer system and a communication application, such as an Internet browser. Although the network interface may be associated with either, or both, a private network and a public network (e.g., the Internet), the present technique will be discussed with reference to a website having a plurality of web pages and electronic forms, such as those illustrated in FIGS. 4, 5, and 6. To gain access 110, the client 90 may be asked to enter a password and/or other identification criteria as required by the website or private network. Once the client 90 has gained access to the network interface 110 (e.g. a website), the client 90 may go to or browse to a desired division or service 112, such as a desired medical resource or financial service. In the present technique, the client 90 browses to financial services, specifically to capital investment analysis, and then browses to a query portion 114 for entering client data associated with a desired capital investment in medical resources for a medical facility. For example, the client 90 may go to a query section 116 for entering project data 118, as illustrated in query form 120 of FIG. 4.

In the present technique, the questions on the query form 120 are tailored to obtain a variety of client data, which may be relevant to a financial analysis of medical resources and/or healthcare services associated with a particular medical resource (e.g., medical product or system). Accordingly, the electronic forms may inquire into various matters that may impact revenues, costs & expenses, and into other factors that may be relevant to a financial analysis of a medical facility or a particular medical resource of the client 90. For example, as described below, the query form 120 may inquire into fixed and variable costs and revenues, financing of medical resources, and projected growth or changes in those costs and revenues. Furthermore, the query form 120 may be tailored to the client 90, or it may allow the client 90 to enter client specific categories and data, rather than the healthcare categories illustrated in FIG. 4. In one aspect, the present technique comprises a financial analysis tool, which may be utilized by the client 90 to obtain a customized financial analysis based on the client data. An exemplary embodiment of this financial analysis tool utilizes the Internet, and provides an Internet based financial analysis tool for medical clients to evaluate their operations and a particular medical resource, which may be desired by the medical client and provided by the entity hosting the financial analysis tool.

Figure 4:
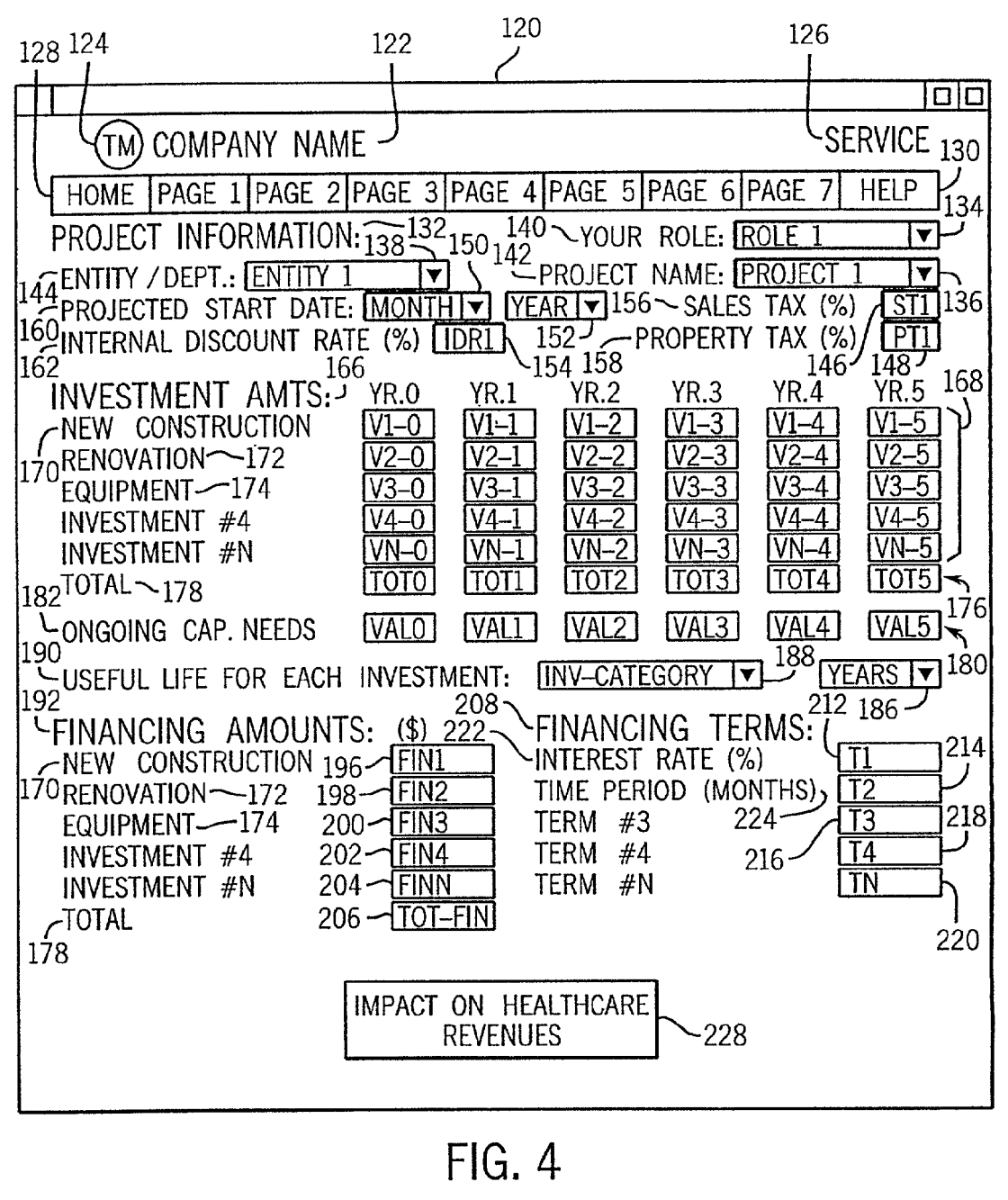

In FIG. 4, the query form 120 is provided for entering client data associated with the desired capital investment. The query form 120 may provide various information to the client 90, such as a company name 122, a company trademark 124, a service area 126, and a variety of links to other pages such as home 128, page 1, page 2, page 3, page 4, page 5, page 6, page 7, and a help page 130. As illustrated, the query form 120 has a Project Information section 132, having drop-down menus 134, 136, and 138 for entering general project information such as your role 140 in the project, a project name 142, and an entity or department 144 associated with the project, such as a ROLE 1, a PROJECT 1, and an ENTITY 1, respectively. The Project Information section 132 may also have text boxes 146 and 148, drop-down menus 150 and 152, and a text box 154 for entering a sales tax 156, a property tax 158, a projected start date 160 (e.g., month and year), and an internal discount rate 162, such as values ST1, PT1, MONTH, YEAR, and IDR1, respectively. Accordingly, the data processing center 22 may account for a variety of variables, such as taxes, timing, laws, and other client and industry specific factors, providing a more accurate financial evaluation of the desired capital investment. The data processing center 22 also may suggest a preferred start date for the capital investment based on financial considerations, such as the variables discussed herein. The internal discount rate 162, or hurdle rate, is a required rate of return set by the client 90 for evaluating investments, such as capital investments in medical resources. The internal discount rate 162 is used in performing time value of money calculations for a desired investment. For an internal rate of return (IRR) capital analysis, the internal discount rate 162 is the rate which the IRR must exceed for a project to be considered acceptable.

The client 90 may then categorically enter investment amounts 164 in an Investment Amount section 166 of the query form 120. For example, the Investment Amount section 166 may have a plurality of text boxes 168 for entering desired investments in new construction 170, in renovation 172, in equipment 174, in an investment #4, and in an investment #N for initial year 0 through year 5, such as investment amounts V1-0 through V1-5, V2-0 through V2-5, V3-0 through V3-5, V4-0 through V4-5, and VN-0 through VN-5, respectively. The client 90 may also enter in a variety of other investments, either in predefined categories or customized investment categories, such as engineering and consulting, contingency, working capital, information systems and other medical resources for the medical facility. The Investment Amount section 166 may also have a plurality of text boxes 176 for entering a plurality of totals 178 for the investments for initial year 0 through year 5, such as values TOT0–TOT5, respectively. Although specific examples have been provided, the Investment Amount section 166 may have a variety of other investment categories according to the desired capital investment or project for the client 90. In addition, a plurality of text boxes 180 may be provided for entering a plurality of ongoing capital needs 182 for initial year 0 through year 5, such as values VAL0–VAL5, respectively. The query form 120 may also allow the client 90 to enter in a useful life for each investment 184 in the Investment Amount section 166. For example, the investment amount section 166 may have drop-down menus 186 and 188 for selecting a useful life and an investment category associated with that useful life, respectively. As illustrated in FIG. 4, the client 90 may simply scroll down the drop-down menu 188, and for each selected investment category in the drop-down menu 188, the client 90 may select a number of years corresponding to the useful life for that investment category from the drop-down menu 186. For example, the client 90 may select "INV-CATEGORY" from the drop-down menu 188, and then select a useful life of "YEARS" from the drop-down menu 186.

Figure 6:
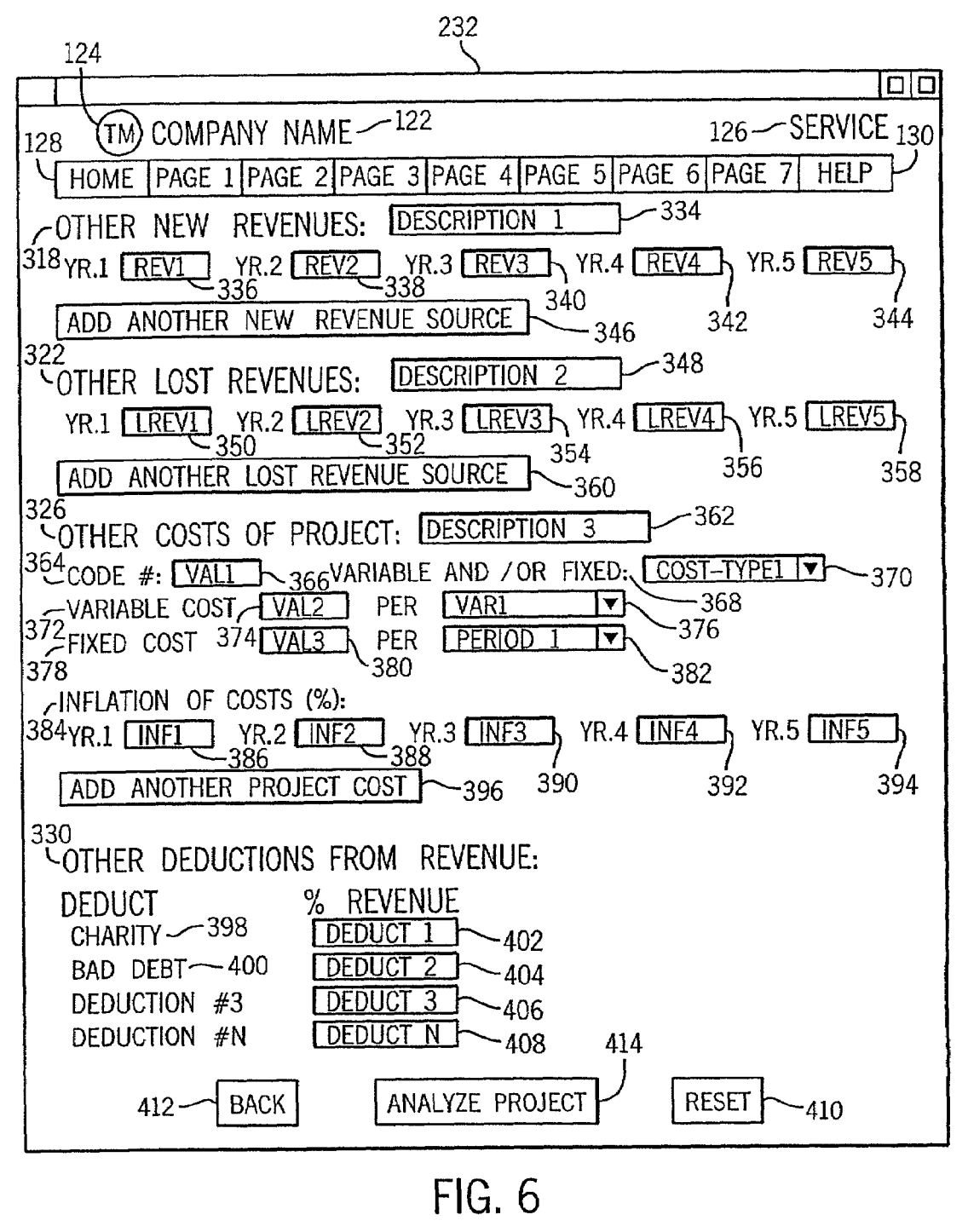

The query form 120 may also have a Financing Amount section 192 allowing the client 90 to enter financing amounts 194 for each category of investments in the Investment Amount section 166. For example, the Financing Amount section 192 may have text boxes 196, 198, 200, 202, 204, and 206 for entering a financing amount corresponding to the new construction investment 170, the renovation investment 172, the equipment investment 174, the investment #4, and the investment #N, as well as the total 178, such as financing amounts of FIN1, FIN2, FIN3, FIN4, FINN, TOT-FIN, respectively. The query form 120 may also have a Financing Terms section 208 for entering financing terms 210 and conditions associated with the financing amounts entered in the financing amount section 192. For example, the Financing Term section 208 may have text boxes 212, 214, 216, 218, and 220 for entering financing terms, such as an interest rate percentage 222, a time period 224, a term #3, a term #4, and a term #N, allowing the client 90 to enter values for those terms such as values T1, T2, T3, T4, and TN, respectively. The client 90 may then continue to a query section 226, which may be integral to, or apart from, the query form 120. As illustrated in FIG. 4, the client 90 may continue to the query section 226 by clicking on a button 228, labeled "Impact on Healthcare Revenues," which directs the client 90 to query forms 230 and 232, as illustrated in FIGS. 5 and 6.

Referring first to FIG. 5, the query form 230 allows the client 90 to enter in a variety of client data associated with healthcare procedures affected by the desired capital investment in medical resources. For example, the query form 230 may have a New Healthcare Procedures section 236 for entering volume and charge information 238 for the new healthcare procedures, a Lost Healthcare Procedures section 240 for entering volume and charge information 242 for any healthcare procedures lost by the desired capital investment, a Payor Mix section 244 for entering payor mix information 246 illustrating the types of parties paying for the healthcare procedures, and a Healthcare Inflation section 248 for entering inflation projections 250 for the healthcare procedures.

In the New Healthcare Procedures section 236, the client 90 may enter a procedure description, such as DESCRIPTION 2, into a text box 252 and enter projected volumes 254 and charges per procedure 256 by categories over a number of years. If the desired capital investment results in a plurality of new healthcare procedures, then additional procedures may be added by clicking on button 258, labeled "Add Another New Healthcare Procedure." As illustrated, in the query form 230, a plurality of text boxes 260 are provided for entering the projected volume 254 by categories of inpatient 262 and outpatient 264 for years 1–5, such as projected volumes of VOL1A–VOL5A and VOL1B–VOL5B, respectively. Similarly, the charge per procedure section 256 allows the client 90 to enter procedure charges, such as charges of I-CHG and O-CHG, into text boxes 270 and 272 by categories of inpatient 266 and outpatient 268, respectively. Although the New Healthcare Procedures section 236 only provides subcategories of inpatient and outpatient for the projected volume 254 and charge per procedure 256, a variety of other subcategories could be provided in that section 236. By completing the New Healthcare Procedure section 236 and clicking on the button 258, the client 90 may add as many new healthcare procedures as are generated by the desired capital investment. Note also, that Forward and Back buttons may be provided to allow the client 90 to scroll through data entries for the New Healthcare Procedures section 236, and a Delete button may be provided to allow removal of any one of the healthcare procedures added in section 236. Alternatively, the present technique may provide a single form having a plurality of the data entry fields described above for the New Healthcare Procedures section 236, rather than a single set of the data entry fields and the button 258.

Similarly, in the Lost Healthcare Procedures section 240, the client 90 may enter as many healthcare procedures as are lost 242 due to the desired capital investment. A description of the lost healthcare procedure 240, such as DESCRIPTION 2, may be entered into a text box 274. Projected volumes 276 for the lost healthcare procedures 240, such as volumes LV1A through LV5A and LV1B through LV5B, may be entered into a plurality of text boxes 278 for years 1 through 5 by categories of inpatient 280 and outpatient 282, respectively. A charge per procedure 284 may also be entered for the lost health care procedures 240 by categories of inpatient 286 and outpatient 288 in text boxes 290 and 292, such as charge amounts of LOST-IC and LOST-OC, respectively. Once the Lost Health Care Procedure section 240 is completely filled out for the healthcare procedure described in the text box 274, a button 294 may be depressed for adding another lost healthcare procedure. If there are no lost healthcare procedures 240, or only one lost healthcare procedure 240, then the client 90 may continue to the Payor Mix section 244. Similar to the New Healthcare Procedures section 254, Forward and Back buttons may be provided to allow the client 90 to scroll through data entries for the Lost Healthcare Procedures section 240, and a Delete button may be provided to allow removal of any one of the healthcare procedures added in the section 240. Alternatively, the present technique may provide a single form having a plurality of the data entry fields described above for the Lost Healthcare Procedures section 240, rather than a single set of the data entry fields and the button 294.

In this section 244, the client 90 categorizes the types of payors for the healthcare procedures, and provides statistics for the categories (e.g., percentage of payors in each category). For example, there may be categories of insurance companies, individuals, elderly, and other payor types for the particular client 90 (e.g., self-pay or medicare). The data processing center 22 may utilize this payor mix information for a variety of calculations, such as for projecting or calculating expected timing of cash flows (e.g., procedure charges/bills) from the payors and/or potential defaults on payments. As illustrated, the payor mix section 244 may be categorized into an Inpatient section 298 and an Outpatient section 300, each having a plurality of payor types. The Inpatient section 298 has a plurality of text boxes 296 for entering numbers or percentages of payors for years 1 through 5 for a payor #1, a payor #N, and a total 302, such as payor mix values of V1-1 through V1-5, VN-1 through VN-5, and TOT1 through TOT5, respectively. Similarly, the Outpatient section 300 has a plurality of text boxes 304 for entering numbers or percentages of payors for years 1 through 5 for a payor #1, a payor #N, and a total 306, such as payor mix values of V1-1 through V1-5, VN-1 through VN-5, and TOT1 through TOT5, respectively. The client 90 also may be allowed to enter in specific types of payors for the Payor Mix section 244, such as payor categories other than the inpatient 298 and outpatient 300 sections, and payor types other than the payor #1, and payor #N. Accordingly, the Payor Mix section 244 allows the data processing center 22 to tailor the financial analysis to the particular type of payors at the medical facility where the client 90 proposes the desired capital investment.

The financial analysis, as generated by the financial engine 100, can also account for healthcare inflation information. Accordingly, the healthcare inflation section 248 provides a plurality of text boxes 308 for entering a projected inflation for an inpatient category 310 and for an outpatient category 312 over years 1 through 5, such as inflation values I1-1 through I1-5 and I2-1 through I2-5, respectively. The query form 230 also has a Continue button 314 for continuing to the query form 232 as illustrated in FIG. 6, and a Back button 316 for returning to the query form 120 as illustrated in FIG. 4. If the client 90 is satisfied with the entries and selections made on the query form 230, then the client 90 may click on the continue button 314 to continue to the query form 232 of the query section 226 and to finish entering project costs and revenues 234.

As illustrated, the query form 232 has an Other New Revenues section 318 for entering other new revenues 320, an Other Lost Revenues section 322 for entering other lost revenues 324, an Other Costs Of Project section 326 for entering other project costs 328, and an Other Deductions From Revenues section 330 for entering other revenue deductions 322 associated with the desired capital investment. If the desired capital investment generates other new revenues, besides those entered on query form 230, then the client 90 may enter other new revenues 320. The client 90 simply enters a description into a text box 334, such as a revenue DESCRIPTION 1, and then for that revenue description 1, the client 90 may enter revenue amounts REV1, REV2, REV3, REV4, and REV5 into text boxes 336, 338, 340, 342, and 344, for years 1 through 5, respectively. If the desired capital investment generates a plurality of other new revenues 318, then the client 90 may click on the button 346, labeled "Add Another New Revenue Source." By clicking button 346, the values in text boxes 334, 336, 338, 340, 342, and 344 are stored and the text boxes are cleared for the client 90 to enter another new revenue expected from the desired capital investment. It should be noted that the client 90 may enter any revenues expected from selling old equipment, which may be replaced by equipment in the desired capital investment. Similarly, if the desired capital investment will result in other lost revenues 322, besides those entered or query form 230, then the client 90 may enter in a DESCRIPTION 2 into text box 348 for that projected lost revenue, and enter in lost revenue amounts LREV1, LREV2, LREV3, LREV4, and LREV5 into text boxes 350, 352, 354, 356, and 358 for years 1 through 5, respectively. If the desired capital investment is expected to cause multiple lost revenues 322, then the client 90 may click on a button 360, which stores the data in text boxes 350 through 358 and clears the text boxes for the client 90 to enter another lost revenue description and corresponding revenue amounts. Note also, that Forward and Back buttons may be provided to allow the client 90 to scroll through data entries for the sections 318 and 322, and a Delete button may be provided to allow removal of any one of the revenues added in sections 318 and/or 322. Alternatively, the present technique may provide a single form having a plurality of the data entry fields described above for the section 318 and 322, rather than a single set of the data entry fields and the buttons 346 and 360.

If the desired capital investment results in other project costs 326, then the client 90 may enter in a corresponding description, such as DESCRIPTION 3, into a text box 362. If the medical facility or client 90 has an internal code for the project cost described in the text box 362, then the client 90 may enter in a code number 364 into a text box 366, such as VAL1. The Other Costs Of Project section 326 may also allow the client 90 to select a type of project cost, such as a variable and/or fixed cost 368 from a drop-down menu 370. For example, the client 90 may select COST-TYPE1 from the drop-down menu 370. According to the selection from the drop-down menu 370, the client 90 may enter a variable cost 372, such as VAL2, into a text box 374 and select a variable, such as VAR1, from a drop down menu 376. Similarly, the client 90 may enter a fixed cost 378, such as VAL3, into a text box 380 and select a period, such as PERIOD 1, from a drop-down menu 382. The period may be a year, a month, a week, or any fixed period that the client may be billed for that fixed cost 378. In this exemplary embodiment, the default in drop-down menu 382 is set to "Annually." The Other Costs Of Project section 326 may also have an Inflation Of Costs section 384, which may allow the client 90 to enter inflation percentages, such as INF1, INF2, INF3, IN4, and INF5, into text boxes 386, 388, 390, 392, and 394 for years 1–5, respectively. Once the client 90 has completed the Other Costs Of Project section 326 for the project cost described in the text box 362, then the client 90 may continue to section 330 or may add another project cost by clicking on a button 396. Note also, that Forward and Back buttons may be provided to allow the client 90 to scroll through data entries for the Other Costs Of Project section 326, and a Delete button may be provided to allow removal of any one of the costs added in the section 326. Alternatively, the present technique may provide a single form having a plurality of the data entry fields described above for the section 326, rather than a single set of the data entry fields and the button 396. If there are no other project costs, then the client 90 may enter in other deductions from revenue 330, such as a charity deduction 398, a bad debts deduction 400, a deduction #3, and a deduction #N, into text boxes 402, 404, 406, and 408. For example, revenue deduction percentages of DEDUCT 1, DEDUCT 2, DEDUCT 3, and DEDUCT N, may be entered into text boxes 402, 404, 406, and 408, respectively.

If the client 90 makes a mistake on the query form 230, or simply wishes to reset the form, the client 90 may simply click on a Reset button 410. If the client 90 desires to go back to the query form 230, then a Back button 412 may be depressed by the client 90. If the client is satisfied with the entries and selections in query forms 120, 230, and 232, then the client 90 may depress an Analyze Project button 414 to continue and financially analyze the project 416. At this point, the client data entered into query forms 120, 230, and 232 is transmitted to the processing system (e.g., the financial engine 100 of the data processing center 22) for a financial analysis of the desired capital investment 418.

The data processing center 22 (e.g., the financial engine 100) analyzes the client data according to a variety of financial and capital investment analysis methods, such as discounted cash flows, internal rate of return (IRR), payback periods, discounted payback periods, a break-even analysis, pro forma financial statements (e.g., income statements, cash flow statements, and balance statements), and other suitable capital investment analysis techniques. The financial engine 100 may utilize a plurality of mathematical software applications to financially analyze the client data, and may have one or more of the rules interface modules 102. For example, the financial engine 100 may comprise a spreadsheet for laying out and analyzing the client data, a statistics program for statistically analyzing the client data, a graphics program for plotting the client data, and a web page development application for producing web pages from the client data analyzed by the data processing center 22. The rules interface module 102 also may have a tax module, a time value of money module (e.g., for evaluating a present value of cash flows), and/or a healthcare/medical module (e.g., having rules particular to the medical field or the particular client 90). Once the financial engine 100 has completed the financial analysis, the data processing center 22 transmits the financial analysis of the desired capital investment to the client 90. The client 90 then electronically receives the financial analysis and views the results via the network interface.

According to the embodiments illustrated in FIGS. 1–6, the present technique provides an exemplary method for analyzing an investment in medical resources for a medical facility. The method may comprise providing access to a financial analysis system via a network, providing a network interface having a form for communication and data exchange with the financial analysis system, analyzing the client data with the financial analysis system, generating an investment analysis report of the desired investment tailored to the client data, and transmitting the investment analysis report to a client via the network.

The present technique also may comprise identifying the client 90 and tailoring the network interface to the client 90, which may involve storing at least a portion of the client data and tailoring the form to the client 90 according to the portion of client data. For example, a client profile may be stored locally, or on a web server, to assist with client identification, and/or client data (e.g., financial data from prior years) may be stored on the data processing system 22 for use in analyzing the desired capital investment. Moreover, providing the network interface may involve providing a server (e.g., an applications server or web server), providing or configuring communications hardware and software, allowing Internet access, and/or configuring a client computer system to procure communication between the client 90 and the financial analysis system.

The present technique, as described above, may also comprise directing, receiving or procuring transmission of the client data from the form (e.g., data entry fields) to the financial analysis system. This may involve formatting, addressing, transmitting, directing, and/or generally routing the client data through the communication system 10 to the data processing center 22, and receiving, handling, and processing the requests via the various processing components (e.g., hardware & software) at the data processing center 22. Accordingly, the present technique may comprise processing client data, such as financial data relating to a desired capital investment in medical resources for the medical facility, an investment cost, a financing amount, financing terms, an interest rate, an internal discount rate set by the client for evaluating investment acceptability, medical procedure statistics expected to be changed (e.g., lost or gained procedures) by implementing the desired investment, a projected mix of payor types (e.g., age groups, insurance type or self pay, inpatient/outpatient, etc.), a projected inflation rate, a projected lost or gained revenue or cost, a projected lost or gained deduction, a desired timing for implementing the desired investment, a value of existing resources, projected tax data, a set of financial rules (e.g., tax, present value, for analyzing the client data, and various other data.

The financial analysis system may then analyze the client data, which may include evaluating a time value of money, determining a net present value of the desired investment, determining and comparing an internal rate of return against the internal discount rate, and evaluating and comparing a plurality of the desired investments. The present technique may then generate an investment analysis report, which may comprise generating pro forma financial statements tailored to the client data, generating a discounted cash flow analysis report (e.g., a net present value analysis report), and/or generating a variety of other financial reports and summaries, which may be displayed on the network interface.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method for analyzing a capital investment in medical resources for a medical facility, the method comprising:
   providing to a client access to an investment analysis system;
   providing to the client a form for transmitting client data to the investment analysis system;
   receiving from the client medical procedure statistics projected to be changed by implementing a desired capital investment in medical resources for a medical facility and receiving at least one of:
   projected statistics for a new medical procedure generated by the desired capital investment;
   projected statistics for a lost medical procedure from implementing the desired capital investment;
   a projected mix of payor types for at least one medical procedure, the payor types comprising inpatients and outpatients at the medical facility; or
   a combination thereof;
   analyzing the client data with the investment analysis system, wherein the client data comprises financial data relating to the desired capital investment;
   generating an investment analysis report of the desired capital investment, wherein the investment analysis report is tailored to the client data; and
   transmitting the investment analysis report to the client.

2. The method of claim 1, comprising coupling the investment analysis system to the Internet.

3. The method of claim 1, comprising storing at least a portion of the client data, and tailoring the form for the client according to the portion of client data.

4. The method of claim 1, comprising receiving the client data from a network interface at the investment analysis system via a network.

5. The method of claim 4, comprising receiving an investment cost for the desired capital investment.

6. The method of claim 4, comprising receiving a financing amount for the desired capital investment.

7. The method of claim 4, comprising receiving client-defined potential financing terms for the desired capital investment.

8. The method of claim 7, comprising receiving an interest rate.

9. The method of claim 4, comprising receiving a projected inflation rate.

10. The method of claim 4, comprising receiving a projected revenue generated by implementing the desired capital investment.

11. The method of claim 4, comprising receiving a projected revenue lost by implementing the desired capital investment.

12. The method of claim 4, comprising receiving a projected revenue deduction relating to the desired capital investment.

13. The method of claim 4, comprising receiving a desired timing for implementing the desired capital investment.

14. The method of claim 4, comprising receiving a projected value of existing medical resources to be replaced by the desired capital investments.

15. The method of claim 4, comprising receiving projected tax data for the medical facility.

16. The method of claim 1, comprising receiving the projected statistics for the new medical procedure generated by the desired capital investment.

17. The method of claim 1, comprising receiving the projected statistics for the lost medical procedure from implementing the desired capital investment.

18. The method of claim 1, comprising receiving the projected mix of payor types for the at least one medical procedure.

19. The method of claim 1, wherein generating an investment analysis report comprises generating pro forma financial statements tailored to the client data.

20. The method of claim 1, wherein generating an investment analysis report comprises generating a discounted cash flow analysis report.

21. The method of claim 20, wherein generating a discounted cash flow analysis report comprises generating a net present value analysis report.

22. The method of claim 20, wherein generating a discounted cash flow analysis report comprises comparing a plurality of the desired capital investments.

23. The method of claim 1, comprising receiving:
the projected statistics for the new medical procedure generated by the desired capital investment;
the projected statistics for the lost medical procedure from implementing the desired capital investment; and
the projected mix of payor types for the at least one medical procedure, the payor types comprising inpatients and outpatients at the medical facility.

24. A method for analyzing a capital investment in medical resources for a medical facility, the method comprising:
providing access to an investment analysis system via a network;
providing a network interface for communication with the investment analysis system, the network interface comprising a form for transmitting client data to the investment analysis system;
receiving from a client medical procedure statistics projected to be changed by implementing a potential capital investment in medical resources for a medical facility and receiving at least one of:
projected statistics for a new medical procedure generated by the potential capital investment;
projected statistics for a lost medical procedure from implementing the potential capital investment;
a projected mix of payor types for at least one medical procedure, the payor types comprising inpatients and outpatients at the medical facility; or
a combination thereof;
analyzing the client data with the investment analysis system, wherein the client data comprises financial data relating to the potential capital investment, the financial data including client-defined potential financing terms for the potential capital investment;
generating an investment analysis report of the potential capital investment, wherein the investment analysis report is tailored to the client data; and
transmitting the investment analysis report to the client via the network.

25. The method of claim 24, comprising receiving the client data from the network interface at the investment analysis system via the network.

26. The method of claim 25, comprising receiving an investment cost for the potential capital investment.

27. The method of claim 25, comprising receiving a financing amount for the potential capital investment.

28. The method of claim 25, comprising receiving an interest rate.

29. The method of claim 25, comprising receiving a projected revenue generated by implementing the potential capital investment.

30. The method of claim 25, comprising receiving a projected revenue lost by implementing the potential capital investment.

31. The method of claim 25, comprising receiving a projected revenue deduction relating to the potential capital investment.

32. The method of claim 25, comprising receiving a desired timing for implementing the potential capital investment.

33. The method of claim 25, comprising receiving a projected value of existing medical resources to be replaced by the potential capital investment.

34. The method of claim 24, comprising receiving the projected statistics for the new medical procedure generated by the potential capital investment.

35. The method of claim 24, comprising receiving the projected statistics for the lost medical procedure from implementing the potential capital investment.

36. The method of claim 24, comprising receiving the projected mix of payor types for the at least one medical procedure.

37. The method of claim 24 comprising receiving:
the projected statistics for the new medical procedure generated by the potential capital investment;
the projected statistics for the lost medical procedure from implementing the potential capital investment; and
the projected mix of payor types for the at least one medical procedure, the payor types comprising inpatients and outpatients at the medical facility.

38. A method for analyzing a capital investment in medical resources for a medical facility, the method comprising:
providing access to an investment analysis system via a network;

providing a network interface for communication with the investment analysis system, the network interface comprising a form for transmitting client data to the investment analysis system;

receiving from a client medical procedure statistics projected to be changed by implementing a desired capital investment in medical resources for a medical facility and receiving at least one of:

projected statistics for a new medical procedure generated by the desired capital investment;

projected statistics for a lost medical procedure from implementing the desired capital investment;

a projected mix of payor types for at least one medical procedure, the payor types comprising inpatients and outpatients at the medical facility; or a combination thereof;

analyzing the client data with the investment analysis system, wherein the client data comprises financial data relating to the desired capital investment and the medical procedure statistics projected to be changed by implementing the desired capital investment;

generating an investment analysis report of the desired capital investment, wherein the investment analysis report is tailored to the client data; and transmitting the investment analysis report to the client via the network.

39. The method of claim 38, comprising storing at least a portion of the client data, and tailoring the form for the client according to the portion of client data.

40. The method of claim 38, wherein generating an investment analysis report comprises generating pro forma financial statements tailored to the client data.

41. The method of claim 38, wherein generating an investment analysis report comprises generating a discounted cash flow analysis report.

42. The method of claim 41, wherein generating a discounted cash flow analysis report comprises generating a net present value analysis report.

43. The method of claim 41, wherein generating a discounted cash flow analysis report comprises comparing a plurality of the desired capital investments.

44. The method of claim 38, comprising receiving:

the projected statistics for the new medical procedure generated by the desired capital investment;

the projected statistics for the lost medical procedure from implementing the desired capital investment; and the projected mix of payor types for the at least one medical procedure, the payor types comprising inpatients and outpatients at the medical facility.

45. A method for analyzing a capital investment in medical resources for a medical facility, the method comprising:

providing access to an investment analysis system via a network;

providing a network interface for communication with the investment analysis system, the network interface comprising a form for transmitting client data to the investment analysis system;

receiving the client data from the network interface at the investment analysis system via the network, the client data including an internal discount rate set by the client for evaluating investment acceptability, client-defined financing terms for the desired capital investment, medical procedure statistics expected to be changed by implementing a desired capital investment in medical resources for a medical facility, and at least one of:

projected statistics for a new medical procedure generated by the desired capital investment;

projected statistics for a lost medical procedure from implementing the desired capital investment;

a projected mix of payor types for at least one medical procedure, the payor types comprising inpatients and outpatients at the medical facility; or a combination thereof;

analyzing the client data with the investment analysis system, wherein the client data comprises financial data relating to the desired capital investment;

generating an investment analysis report of the desired capital investment, wherein the investment analysis report is tailored to the client data; and transmitting the investment analysis report to the client via the network.

46. The method of claim 45, comprising coupling the investment analysis system to the Internet.

47. The method of claim 45, comprising storing at least a portion of the client data, and tailoring the form for the client according to the portion of client data.

48. The method of claim 45, comprising receiving an investment cost for the desired capital investment.

49. The method of claim 45, comprising receiving a financing amount for the desired capital investment.

50. The method of claim 45, comprising receiving an interest rate.

51. The method of claim 45, comprising receiving the projected statistics for the new medical procedure generated by the desired capital investment.

52. The method of claim 45, comprising receiving the projected statistics for the lost medical procedure from implementing the desired capital investment.

53. The method of claim 45, comprising receiving the projected mix of payor types for the at least one medical procedure.

54. The method of claim 45, comprising receiving a projected inflation rate.

55. The method of claim 45, comprising receiving a projected revenue generated by implementing the desired capital investment.

56. The method of claim 45, comprising receiving a projected revenue lost by implementing the desired capital investment.

57. The method of claim 45, comprising receiving a projected revenue deduction relating to the desired capital investment.

58. The method of claim 45, comprising receiving a desired timing for implementing the desired capital investment.

59. The method of claim 45, comprising receiving a projected value of existing medical resources to be replaced by the desired capital investment.

60. The method of claim 45, comprising receiving projected tax data for the medical facility.

61. The method of claim 45, wherein generating an investment analysis report comprises generating pro forma financial statements tailored to the client data.

62. The method of claim 45, wherein generating an investment analysis report comprises generating a discounted cash flow analysis report.

63. The method of claim 62, wherein generating a discounted cash flow analysis report comprises generating a net present value analysis report.

64. The method of claim 62, wherein generating a discounted cash flow analysis report comprises comparing a plurality of the desired capital investments.

65. The method of claim 45, comprising receiving:
the projected statistics for the new medical procedure generated by the desired capital investment;
the projected statistics for the lost medical procedure from implementing the desired capital investment; and
the projected mix of payer types for the at least one medical procedure, the payor types comprising inpatients and outpatients at the medical facility.

* * * * *